(12) United States Patent
Lee

(10) Patent No.: US 6,957,857 B1
(45) Date of Patent: Oct. 25, 2005

(54) SHELL CONSTRUCTION FOR A BICYCLE SEAT

(76) Inventor: Ching-Song Lee, No. 323, Chung-Hua Road, Nan-Tou City (TW)

( * ) Notice: Subject to any disclaimer, the term of this patent is extended or adjusted under 35 U.S.C. 154(b) by 0 days.

(21) Appl. No.: 10/944,931

(22) Filed: Sep. 20, 2004

(51) Int. Cl.[7] .................................................. B62J 1/00
(52) U.S. Cl. ............................. 297/215.16; 297/195.1
(58) Field of Search ....................... 297/195.1, 215.16, 297/452.57

(56) References Cited

U.S. PATENT DOCUMENTS

| | | | |
|---|---|---|---|
| 620,946 A * | 3/1899 | Meisselbach | 297/202 |
| 1,975,405 A * | 10/1934 | Pryale | 297/215.16 |
| 3,264,034 A * | 8/1966 | Lawson | 297/452.57 |
| 3,840,269 A * | 10/1974 | Ambrose | 297/452.56 |
| 5,927,802 A * | 7/1999 | Kesinger | 297/204 |
| 6,095,601 A * | 8/2000 | Yu | 297/215.16 |
| 6,139,097 A * | 10/2000 | Yates | 297/195.1 |
| 6,739,656 B2 * | 5/2004 | Yu | 297/215.16 |
| 2004/0004374 A1 * | 1/2004 | Garland et al. | 297/195.1 |

* cited by examiner

*Primary Examiner*—Peter R. Brown
(74) *Attorney, Agent, or Firm*—Baker & Daniels

(57) ABSTRACT

A shell construction for a bicycle seat includes a woven structure and a rigid cover. The woven structure is made of a high strength thread. The rigid cover is formed of a plastic material, and is molded over the woven structure. The plastic material penetrates the woven structure. The rigid cover has a top wall and a skirt member projecting from a periphery of the top wall.

5 Claims, 5 Drawing Sheets

SHELL CONSTRUCTION FOR A BICYCLE SEAT

BACKGROUND OF THE INVENTION

1. Field of the Invention

The invention relates to a shell construction, more particularly to a shell construction for a bicycle seat.

2. Description of the Related Art

A conventional shell construction for a bicycle seat is generally made of a rigid plastic material in a shape of a saddle, which is mounted on a seat post for connection to a seat tube of a bicycle. In view of the structural strength required to support the weight of the rider, the conventional shell construction should have a considerable thickness, which in turn increases undesirably the overall weight of the bicycle.

SUMMARY OF THE INVENTION

Therefore, the object of the present invention is to provide a shell construction for a bicycle seat, which is lightweight and has superior structural strength.

According to this invention, a shell construction for a bicycle seat includes a woven structure and a rigid cover. The woven structure is made of a high strength thread. The rigid cover is formed of a plastic material, and is molded over the woven structure. The plastic material penetrates the woven structure. The rigid cover has a top wall and a skirt member projecting from a periphery of the top wall.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
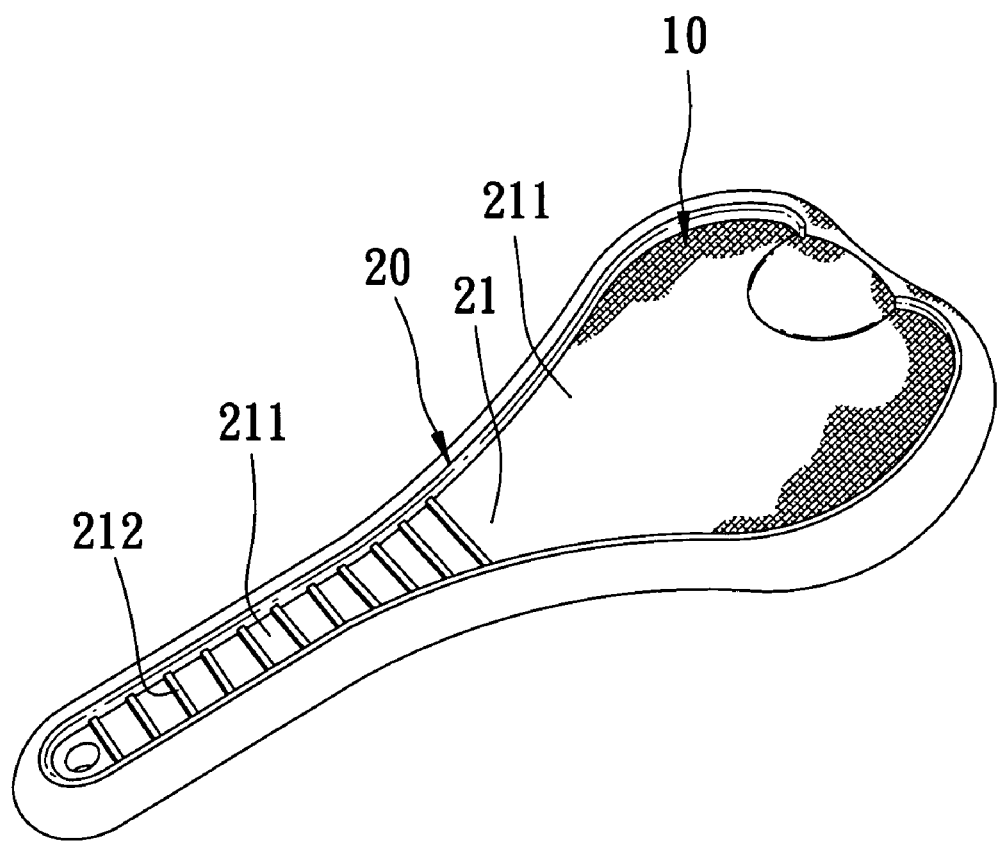
FIG. 1 is a top perspective view of the preferred embodiment of a shell construction for a bicycle seat according to this invention.
Figure 2:
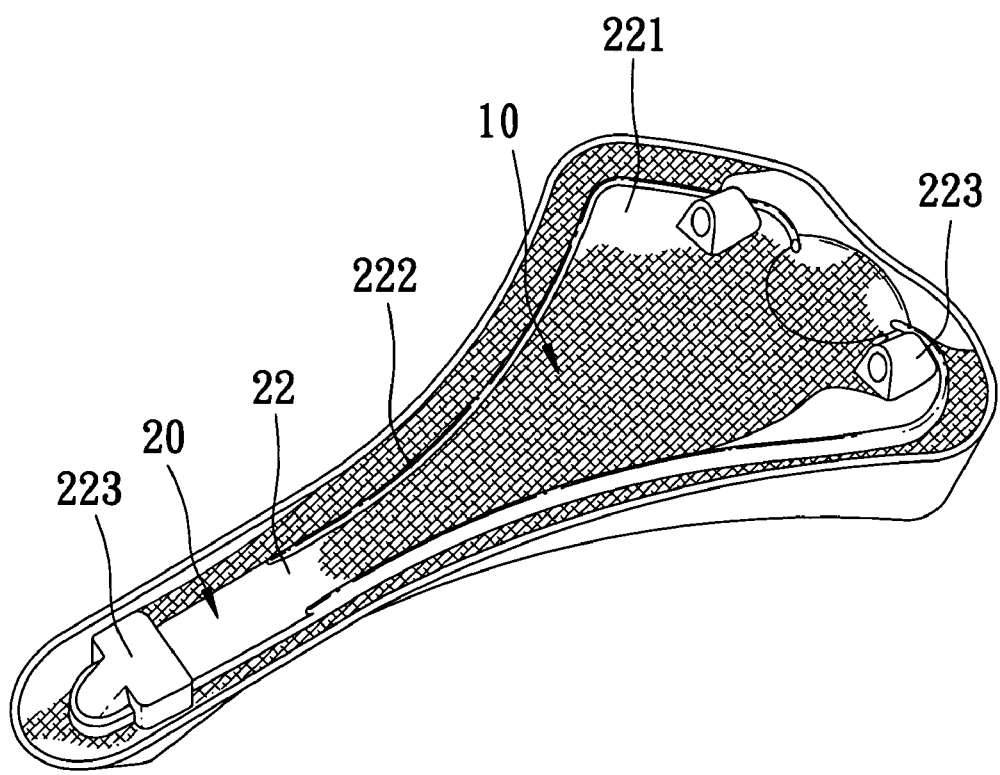
FIG. 2 is a bottom perspective view of the preferred embodiment.
Figure 3:
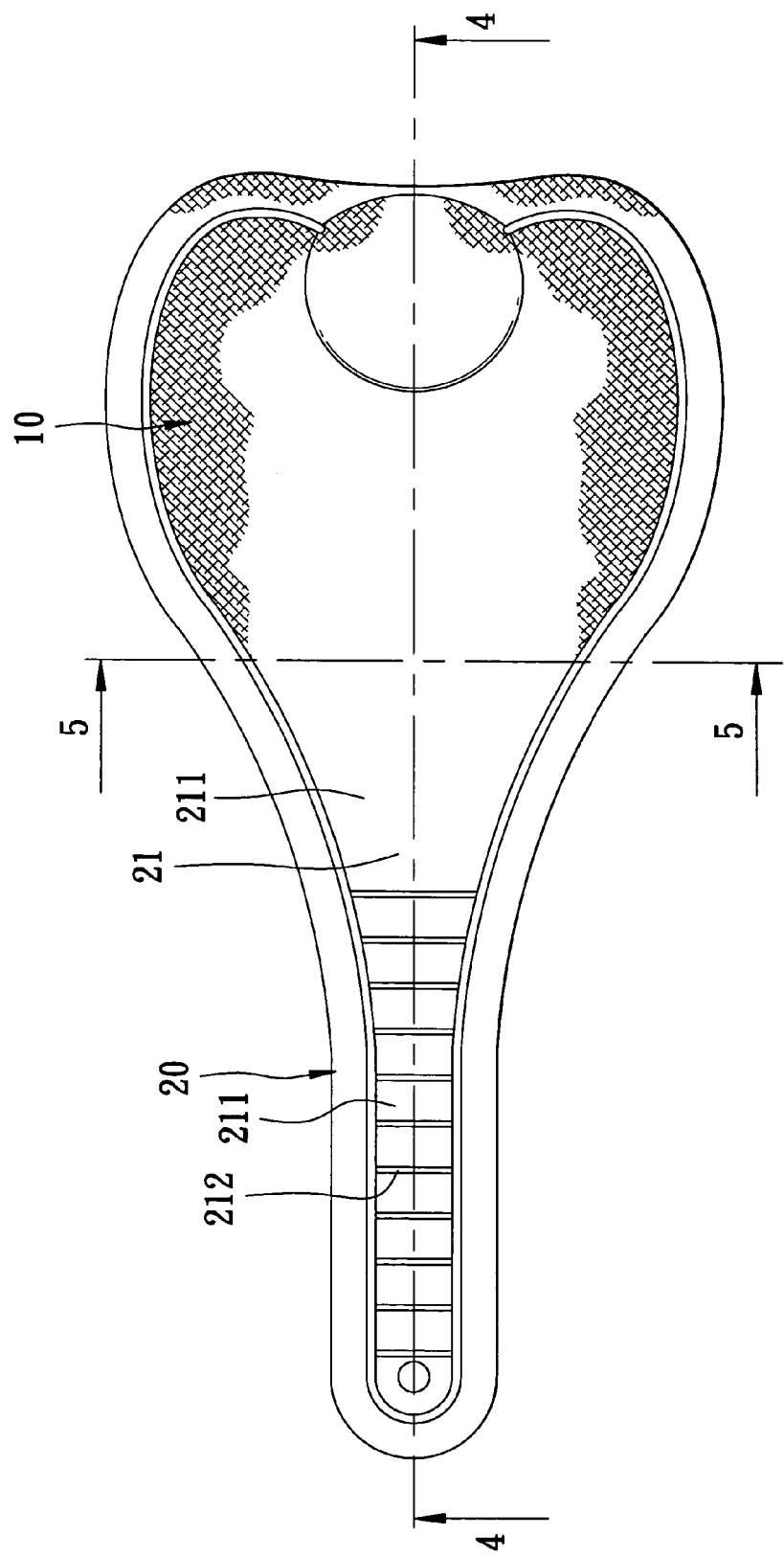
FIG. 3 is a top view of the preferred embodiment.

Referring to FIGS. 1, 2 and 3, the preferred embodiment of the shell construction for a bicycle seat according to this invention includes a woven structure 10 and a rigid cover 20 partially covering the woven structure 10.

Figure 4:
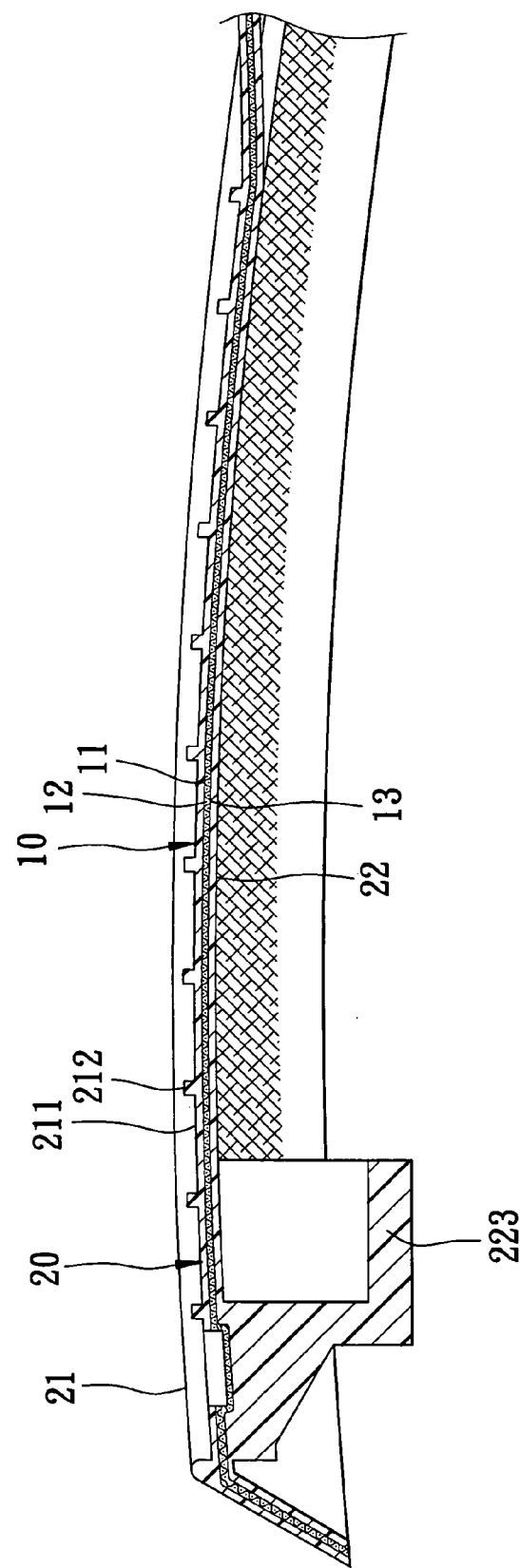
FIG. 4 is a sectional view of the preferred embodiment, taken along line 4—4 of FIG. 3.
Figure 5:
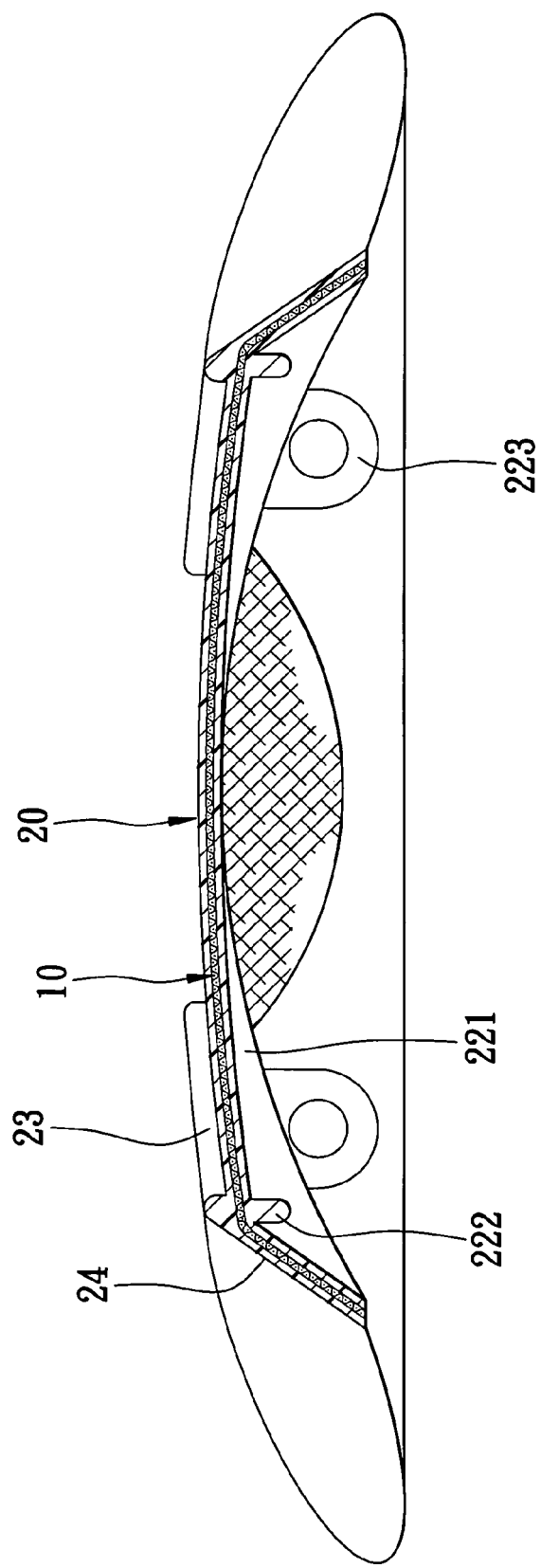
FIG. 5 is a sectional view of the preferred embodiment, taken along line 5—5 of FIG. 3.

Referring to FIGS. 4 and 5, the woven structure 10 is made of a high strength thread 11. Preferably, the high strength thread 11 is made of nylon or metal. The woven structure 10 has a top surface 12 and a bottom surface 13 opposite to the top surface 12. The rigid cover 20 is formed of a plastic material, and is molded over the woven structure 10. The plastic material penetrates the woven structure 10 during molding. The rigid cover 20 has a top wall 23 and a skirt member 24 projecting from a periphery of the top wall 23. The top wall 23 has a top surface 21 and a bottom surface 22 opposite to the top surface 21. In this embodiment, the woven structure 10 is partially exposed from the top and bottom surfaces 21,22 of the top wall 23.

The top surface 21 of the top wall 23 includes a concave surface 211, which is concaved downward. The bottom surface 22 of the top wall 23 includes a convex surface 221, which is convexed downward and which has a contour corresponding to that of the concave surface 211. The top surface 21 of the top wall 23 further includes a plurality of reinforcing ribs 212 formed on the concave surface 211. The bottom surface 22 of top wall 23 further includes a reinforcement flange 222 protruding from the bottom surface 22 and extending substantially along the periphery of the top wall 23 and inwardly of the skirt member 24. The rigid cover 20 further includes a plurality of mounting blocks 223 projecting downwardly from the bottom surface 22.

When making the shell construction, the woven structure 10 is cut into a shape substantially corresponding to a desired contour of the shell construction, and is placed in a mold (not shown). The plastic material for the rigid cover 20 is subsequently injected and molded in the mold to form a semi-product. The semi-product is removed from the mold and is finished by trimming the periphery of the woven structure 10 protruding out of the rigid cover 20 so as to obtain the shell construction.

In view of the aforesaid, the shell construction for a bicycle seat of this invention has the following advantages:

(1) The thickness of the rigid cover 20 can be reduced to thereby reduce the overall weight of the shell construction while obtaining a desirable structural strength for the shell construction by virtue of the woven structure 10.

(2) The structural strength of the shell construction is further enhanced by the concave surface 211, the reinforcing ribs 212, the convex surface 221, and the reinforcement flange 22.

(3) The aesthetic effects can be increased by exposing the woven structure 10 partially from the top and bottom surfaces 21, 22 of the top wall 23 of the rigid cover 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A shell construction for a bicycle seat, comprising:
a woven structure made of a high strength thread; and
a rigid cover formed of a plastic material, and molded over said woven structure, said plastic material penetrating said woven structure, said rigid cover having a top wall and a skirt member projecting from a periphery of said top wall, said top wall having a top surface and a bottom surface opposite to said top surface;
said top surface of said top wall including a concave surface which is concaved downward, said bottom surface of said top wall including a convex surface which is convexed downward and which has a contour corresponding to that of said concave surface, said top surface of said top wall further including a plurality of reinforcing ribs formed on said concave surface.

2. The shell construction as claimed in claim 1, wherein said high strength thread is made of a material selected from the group consisting of nylon and metal.

3. The shell construction as claimed in claim 1, wherein said woven structure is partially exposed at least from said top surface of said top wall.

4. The shell construction as claimed in claim 1, wherein said bottom surface of said top wall further includes a reinforcement flange protruding from said bottom surface and extending substantially along said periphery of said top wall and inwardly of said skirt member.

5. The shell construction as claimed in claim 1, wherein said rigid cover further includes a mounting block projecting downwardly from said bottom surface.

* * * * *